United States Patent [19]

de Meurisse

[11] 3,897,977

[45] Aug. 5, 1975

[54] WHEEL BALANCER

[75] Inventor: Michael de Meurisse, Belvedere, Calif.

[73] Assignee: Pacer Products, Inc., Sunnyvale, Calif.

[22] Filed: June 21, 1973

[21] Appl. No.: 372,261

[52] U.S. Cl............................ 301/5 BA; 301/9 DN
[51] Int. Cl.² ........................................ B60B 13/00
[58] Field of Search............ 301/5 BA, 37 S, 37 SA, 301/9 DN

[56] References Cited
UNITED STATES PATENTS

| | | | |
|---|---|---|---|
| 2,885,244 | 5/1959 | Smith | 301/9 DN |
| 3,317,246 | 5/1967 | Wester | 301/37 SA |
| 3,346,303 | 10/1967 | Wesley | 301/5 BA |
| 3,376,075 | 4/1968 | Mitchel | 301/5 BA |
| 3,427,077 | 2/1969 | Cole | 301/5 BA |

*Primary Examiner*—Philip Goodman
*Attorney, Agent, or Firm*—Jack M. Wiseman

[57] ABSTRACT

A wheel balancer having a central disc shaped body having a plurality of radial slots, extending from its central hub aperture through which the lug bolts of a brake drum may extend, the body being secured between the central disc of a wheel, also secured to the brake drum by the lug bolts. A circular tube filled with a liquid and small shot is secured to the body at its peripheral edge, the shot migrating to locations along the tube to balance out unbalance forces in the wheel when the wheel is rotating.

The body of the wheel balancer is provided with breakoff tangs about the hub aperture between adjacent slots whereby the wheel balancer may be easily modified to be mountable on a brake drum whose hub cover is of a larger diameter.

6 Claims, 3 Drawing Figures

WHEEL BALANCER

This invention relates to wheel balancers and more particularly to wheel balancers for use with vehicle wheels.

Automobile wheels and the brake drums on which they are mountable vary in the numbers and locations of lug bolts by which the wheels are secured to the brake drums in accordance with the particular manufacturer and model. The great majority of vehicles being currently manufactured have wheels which are secured either by four, five or eight lug bolts. The lug bolts of different make vehicles are spaced different radial distances from the central axis of the wheel. In addition the hub caps or covers which extend outwardly of the brake drums and enclose the outer end of the wheel hubs are, in the case of most vehicle models, of either of two different external diameters.

Due to these many variables between different makes and models of vehicles, the use of wheel balancers which are securable to the brake drums by the same lug bolts as the wheels has not been wide spread due to the cost of manufacture, and maintenance of inventory, of different models of wheel balancers each adapted for use on only a limited number of models of vehicles.

Accordingly, it is an object of this invention to provide a new and improved wheel balancer of such structure that a very limited number of models, for example, two, of the wheel balancers need be furnished for mounting on the brake drums of a great majority of the current makes and models of vehicles, such as passenger automobiles.

It is another object of the invention to provide a wheel balancer, of the type described, having a circular planar body provided with a central hub aperture and a plurality of slots extending outwardly from the central aperture for receiving lug bolts of brake drums of different vehicle makes and models which are spaced different distances from the central axis of the wheels.

Another object is to provide a wheel balancer, of the type described, wherein the central aperture of the body, originally of a first diameter to accomodate hub caps of a first external diameter, may be easily enlarged at the location of the installation of the balancer to a second diameter for accomodating hub covers of a second greater external diameter.

Still another object is to provide a wheel balancer, of the type described, wherein predetermined innermost portions or tangs of the body, defined by lines of weakened mechanical strength, are easily broken off to enlarge the central aperture of the body to permit installation of the balancer on a brake drum having a large diameter hub cover.

A further object is to provide a wheel balancer, of the type described wherein the circular tube is secured to the body by a peripheral flange which overlays extreme outer peripheral portions of the body.

An important object of the invention is to provide a wheel balancer which is of simple economical structure and is mountable over different brake drums having different numbers of lug bolts spaced different distances from the central axis of the brake drum.

Additional objects and advantages of the invention will be readily apparent from the reading of the following description of a device constructed in accordance with the invention, and reference to the accompanying drawings thereof, wherein.

Figure 1:
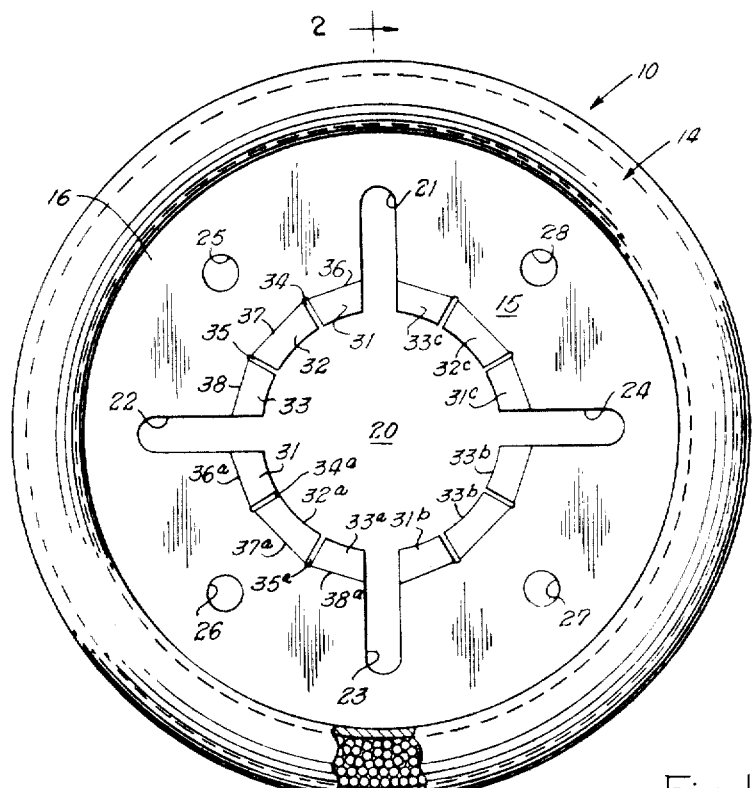
FIG. 1 is a plan view of one form of a wheel balancer embodying the invention which is mountable on brake drums having four or eight lug bolts.

Referring now to the drawings, the wheel balancer 10 is adjusted to be mounted on brake drums 11 of many different makes and models of vehicles having either four or eight lug bolts. The wheel balancer includes a circular body 12 whose peripheral portion 13 on which is mounted a tubular ring 14 is offset forwardly from the central portion 15 of the body by an annular outwardly and forwardly inclined connector portion 16.

The planar central portion is adapted to abut the vertical front surface 17 of a brake drum 18 of a vehicle. The brake drum, of course also has a central hub, not shown, which is covered by a hub cover 19 secured to the drum. The hub cover extends through a central aperture 20 of the body which is of the same or very slightly smaller diameter than the external diameter of the hub cover so that the inner edges of the body defining the central aperture engage the hub cover as the wheel balancer is telescoped thereover and help cause it to be properly centrally aligned on the drum.

The central portion 15 is provided with four lug bolt slots 21, 22, 23 and 24 which are spaced ninety degrees apart and which extend radially outwardly from the central aperture. Bolt apertures 25, 26, 27 and 28 are also provided in the central portion and are spaced equidistantly, i.e., 45°, from the adjacent slots between which they are located.

The apertures 25–28 are so spaced from the central axis of the body that their central axis line on the same circular line as the axes of curvature of the surfaces of the central portion defining the outer ends of the slots.

The central portion 15 has inner portions or tangs 31, 32 and 33 between the slots 21 and 22 which are defined by the radial slots 34 and 35 and the scribe lines or indentations 36, 37 and 38 which provide lines of weakened mechanical strength.

Similar tangs 31a, 32a and 33a are located between the slots 22 and 23; tangs 31b, 32b and 33b are located between the slots 23 and 24; and tangs 31c, 32c and 33c are located between the slots 24 and 21. These latter three sets of tangs being formed in the same manner as the tangs 31, 32 and 33, the scribe lines or indentations and slots defining the latter sets have been provided with the same reference numerals, to which the subscripts a, b and c, respectively, have been added as the indentations and slots which define the tangs 31, 32 and 33.

The tube 14 is molded of plastic and may include an outer section 40 of substantially U shape having outer and inner legs 41 and 42 and a bight portion 43. The inner section 44 of the tube is in the form of a flat ring and is telescoped between the legs in the internal facing annular recess 45 and 46, thereof. The end of the inner leg 41 and the inner section 44 abut the peripheral portion 13 of the body while the outer leg 42 overlaps the peripheral edge of the body and has a flange 48 which engages the rear peripheral surface of the body. The flange 48 may be heat formed since the tube is formed of a suitable plastic which is deformable when heated to a predetermined temperature.

The flange 48 of the outer leg 41 of course secures the tube to the body and holds it rigid therewith. If desired a suitable bonding agent or adhesive may also be used to secure the tube to the body.

Prior to or after the assembly of the tube 14 on the body, a charge of liquid, such as aircraft hydraulic fluid, and a charge of hardened steel shot 51 is introduced into the circular passage through a suitable aperture made in the tube which is then closed or plugged.

In use, the wheel balancer is installed on brake drums having small diameter hub covers and four lug bolts 53 spaced ninety degrees apart, by aligning the slots 21–24 with the bolts and telescoping the body over the hub cover until its rear surface engages the front surface of the drum. At this time the bolts are in the slots and their engagement with the surfaces of the central portion 15 of the body defining the slots and the engagement of the inner edge surfaces of the tangs with the hub cover cause the wheel balancer to be properly centrally positioned on the brake drum. Depending on the particular make and model of the vehicle the bolts 53 may be positioned in the slots at different distances from the central axis of the brake drum.

The central disc portion 56 of a wheel W is then positioned on the lug bolts which extend through the bolts which extend through the bolt apertures 57 of the portion 56 and nuts 58 then threaded on the lug bolts hold the wheel balancer and the wheel rigid with the brake drum.

As the vehicle then travels and the wheel reaches a certain minimum speed of rotation, the shot migrates to such locations as will balance any unbalance forces created due to such factors as tire defects, wheel unbalance and the like.

If the brake drum is provided with eight lug bolts, the bolts are spaced 45° apart at the radial distance of the central axes of the apertures 25–28 so that four of the bolts will extend through the slots 21–24 and the other four will extend through the slots 25–28.

If the particular brake drum has the larger diameter hub cover, the tangs are broken off along the scribe lines and the inner edges of the central portion 15 of the body defining the thus enlarged central aperture 20 will engage such large diameter hub cover to help align centrally the wheel balancer on the brake drum.

It will now be seen that the wheel balancer 10 may be mounted on brake drums having eight lug bolts and on different brake drums having four bolts spaced different distances from their central axes.

It will also be seen that the wheel balancer may be easily modified at the site of location to fit brake drums having hub cover of a greater diameter.

Figure 3:
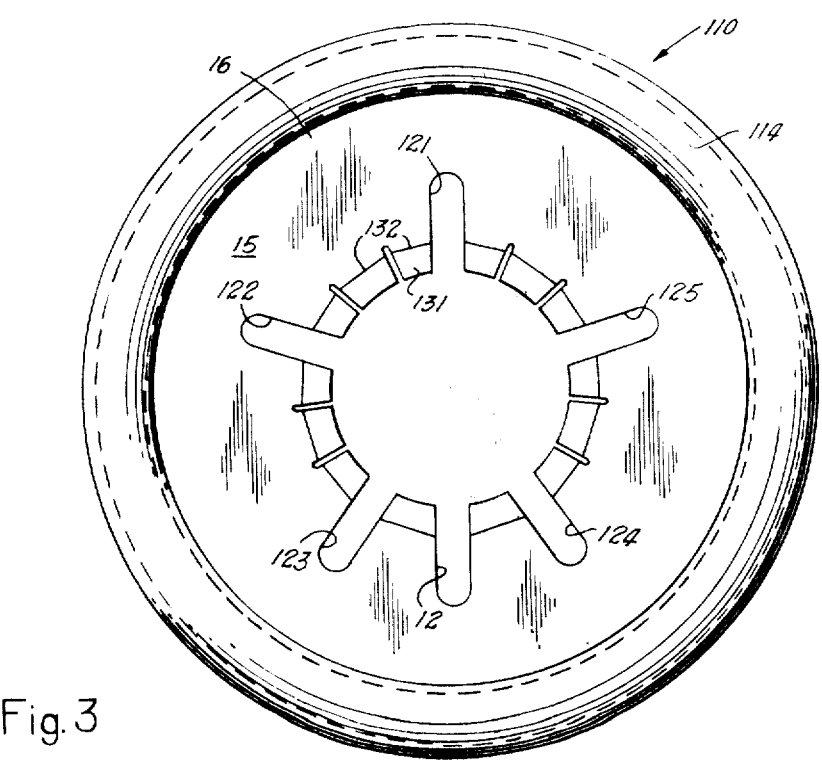
Figure 2:
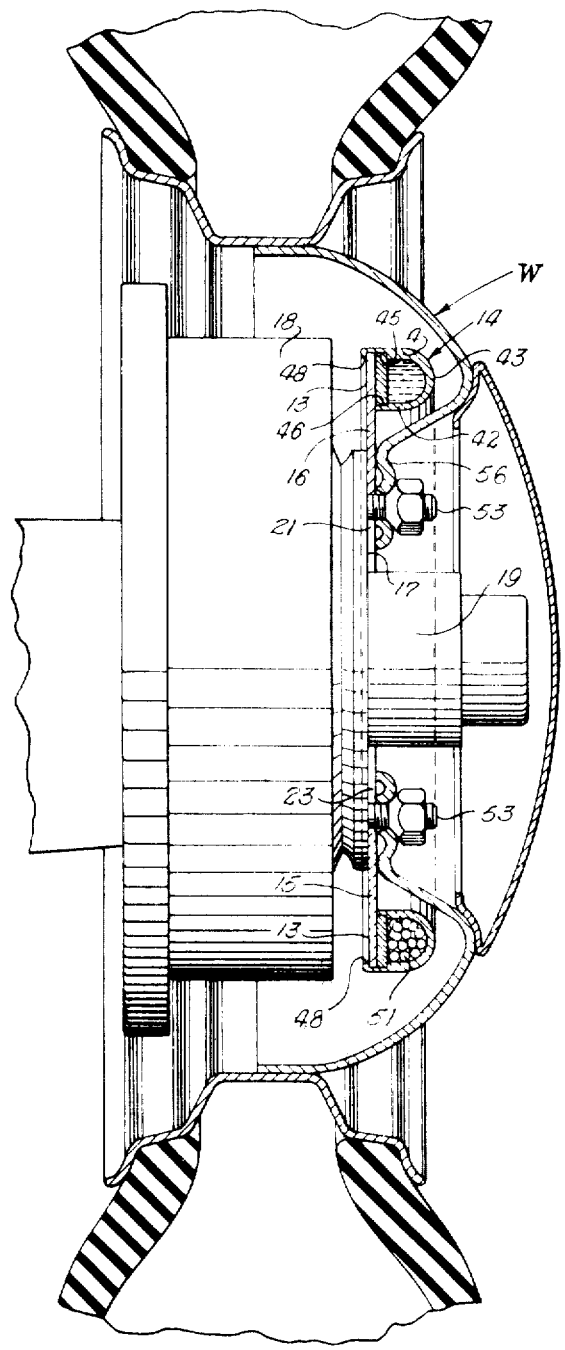
FIG. 2 is a sectional view, taken on line 2—2 of FIG. 1, of the wheel balancer of FIG. 1 showing it in position on a brake drum; and, FIG. 3 is a plan view of another form of the wheel balancer.

Referring now to FIG. 3 of the drawings, the wheel blancer 110 which is mountable on wheel drums having five lug bolts, and in some cases a locating pin 60, is similar to the wheel balancer 10 and, accordingly, its elements have been provided with the same reference numerals, to which the prefix 1 has been added, as the corresponding element of the wheel balancer 10.

The central portion 115 of the body 111 is provided with five slots 121–125 which are spaced 72° apart for receiving the five bolts and a slot 126 intermediate the slots 123 and 124 in which is received a locating pin of the brake drum if the drum is provided with such pin.

The tangs 131a–n are easily broken off along the lines 132a–n of weakened mechanical strength if the hub cover is of the greater diameter.

It has been determined that the two illustrated and described forms of the wheel balancer will permit the very great majority, more than 90 percent, of the wheels of automobiles of both foreign and domestic manufacture to be fitted therewith so that the manufacturer need manufacture only these two forms or models of the wheel balancer and the distributor does not need to maintain a large inventory of different models of the wheel balancer.

The foregoing description of the invention is explanatory only, and changes in the details of the construction illustrated may be made by those skilled in the art, within the scope of the appended claims, without departing from the spirit of the invention.

What is claimed and desired to be secured by Letters Patent is:

1. A wheel balancer mountable on a brake drum of a vehicle, the brake drum having a substantially vertical outer surface, a central hub means extending horizontally outwardly of the vertical surface and a plurality of equidistantly spaced lug bolts located about the hub means and extending horizontally outwardly of the vertical surface, said wheel balancer including: a circular body having a central planar portion adapted to abut the vertical outer surface of a brake drum, said body having a central aperture for receiving the hub means of the drum and a plurality of slots extending outwardly from said central aperture and in communication therewith for receiving the big bolts of the drum and for accommodating various stud patterns; a circular tube secured to said body concentric with said central tube providing a circular closed passage; and a liquid and small shot in said passage and free to move therein.

2. The wheel balancer of claim 1, wherein said slots have a width substantially equal to the diameter of the lug bolts and said central aperture has a diameter substantially equal to the diameter of the hub means whereby said wheel balancer is centrally aligned on the brake drum when telescoped over the hub means and the lug bolts and in vertical abutting relation to the vertical surface.

3. A wheel balancer mountable on a brake drum of a vehicle, the brake drum having a substantially vertical outer surface, a central hub means extending horizontally outwardly of the vertical surface and a plurality of equidistantly spaced lug bolts located about the hub means and extending horizontally outwardly of the vertical surface, said wheel balancer including: a circular body having a central planar portion adapted to abut the vertical outer surface of a brake drum, said body having a central aperture for receiving the hub means of the drum and a plurality of slots extending outwardly from said central aperture and in communication therewith for receiving the big bolts of the drum; a circular tube secured to said body concentric with said central tube providing a circular closed passage; and a liquid and small shot in said passage and free to move therein; said slots having a width substantially equal to the diameter of the lug bolts, whereby said wheel balancer is centrally aligned on the brake drum when telescoped over the hub means and the lug bolts and in vertical abutting relation to the vertical surface, said body having a plurality of inner tang portions provided by lines of weakened mechanical strength located in an arcuate path between successive ones of said slots, said central aperture being enlarged when said tang portions are removed to receive hub means of greater diameter.

4. The wheel balancer of claim 3, wherein said tube has an inner peripheral flange overlapping a peripheral portion of said body securing said tube to said body.

5. The wheel balancer of claim 2 wherein said body has a plurality of inner tang portions provided by lines of weakened mechanical strength located in an arcuate path between successive ones of said slots, said central aperture being enlarged when said tang portions are removed to receive hub means of greater diameter.

6. The wheel balancer of claim 1, wherein said tube has an inner peripheral flange overlapping a peripheral portion of said body securing said tube to said body.

* * * * *